(12) United States Patent
Yoko et al.

(10) Patent No.: US 10,464,441 B2
(45) Date of Patent: Nov. 5, 2019

(54) CHARGING FACILITY AND ENERGY MANAGEMENT METHOD FOR CHARGING FACILITY

(71) Applicant: MITSUBISHI HEAVY INDUSTRIES, LTD., Tokyo (JP)

(72) Inventors: Ryosuke Yoko, Tokyo (JP); Masanori Maruyama, Tokyo (JP); Yoshinori Takeichi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/112,271

(22) Filed: Aug. 24, 2018

(65) Prior Publication Data

US 2018/0361859 A1    Dec. 20, 2018

Related U.S. Application Data

(63) Continuation of application No. 14/917,948, filed as application No. PCT/JP2014/074572 on Sep. 17, 2014, now Pat. No. 10,081,259.

(30) Foreign Application Priority Data

Sep. 19, 2013  (JP) ................................ 2013-194491

(51) Int. Cl.
*B60L 53/20* (2019.01)
*H02J 3/38* (2006.01)
*H02J 7/34* (2006.01)
*H02J 7/35* (2006.01)
(Continued)

(52) U.S. Cl.
CPC .............. *B60L 53/20* (2019.02); *B60L 53/22* (2019.02); *B60L 53/30* (2019.02); *B60L 53/51* (2019.02);
(Continued)

(58) Field of Classification Search
None
See application file for complete search history.

(56) References Cited

U.S. PATENT DOCUMENTS 10,081,259 B2 *   9/2018  Yoko ...................... B60L 53/53
2007/0165347 A1 *  7/2007  Wendt ....................... H02J 3/38
361/92

(Continued)

FOREIGN PATENT DOCUMENTS

CN    102005817 A    4/2011
CN    102354974 A    2/2012
(Continued)

OTHER PUBLICATIONS

Extended European Search Report in EP Application No. 14845465.5 dated Jul. 5, 2016.
(Continued)

*Primary Examiner* — Cassandra F Cox
(74) *Attorney, Agent, or Firm* — Hauptman Ham, LLP

(57) ABSTRACT

A charging facility collects DC power supplied from a plurality of power supply devices in a DC bus, and then uses the DC power to charge an on-board rechargeable battery for an electric vehicle. In an energy management method for a charging facility, each power supply device operates under independent automatic control according to a change in voltage in the DC bus. An upper-level control unit which collectively controls a plurality of power supply sources is not required, and a plurality of power supply devices can be combined with a simple configuration achieved by merely connecting respective output terminals to the DC bus. In addition, the entire charging facility can be operated flexibly. Thus, it is possible to achieve a simple configuration and to allow flexible operation while a plurality of power converters are combined with a system power supply.

34 Claims, 3 Drawing Sheets

(51) Int. Cl.
*H02J 7/00* (2006.01)
*H02J 7/02* (2016.01)
*H02K 47/14* (2006.01)
*B60L 53/22* (2019.01)
*B60L 53/30* (2019.01)
*B60L 53/51* (2019.01)
*B60L 53/53* (2019.01)
*H02J 3/32* (2006.01)

(52) U.S. Cl.
CPC .............. *B60L 53/53* (2019.02); *H02J 3/383* (2013.01); *H02J 3/386* (2013.01); *H02J 7/007* (2013.01); *H02J 7/0068* (2013.01); *H02J 7/022* (2013.01); *H02J 7/34* (2013.01); *H02J 7/35* (2013.01); *H02K 47/14* (2013.01); *B60L 2210/10* (2013.01); *H02J 3/32* (2013.01); *H02J 7/0027* (2013.01); *Y02E 10/563* (2013.01); *Y02E 10/566* (2013.01); *Y02E 60/721* (2013.01); *Y02T 10/7005* (2013.01); *Y02T 10/7088* (2013.01); *Y02T 10/7216* (2013.01); *Y02T 10/92* (2013.01); *Y02T 90/12* (2013.01); *Y02T 90/121* (2013.01); *Y02T 90/127* (2013.01); *Y02T 90/14* (2013.01); *Y04S 10/126* (2013.01)

(56) References Cited

U.S. PATENT DOCUMENTS

| | | | |
|---|---|---|---|
| 2012/0326516 A1 | 12/2012 | Gurunathan et al. | |
| 2015/0256025 A1* | 9/2015 | Brhlik | H02J 7/34 307/21 |
| 2016/0052410 A1* | 2/2016 | Zhou | B60L 11/1811 320/109 |

FOREIGN PATENT DOCUMENTS

| | | |
|---|---|---|
| CN | 102437566 A | 5/2012 |
| CN | 102664429 A | 9/2012 |
| CN | 202488178 U | 10/2012 |
| CN | 103269117 A | 8/2013 |
| EP | 2587623 A1 | 5/2013 |
| JP | 2003-339118 A | 11/2003 |
| JP | 2010-220411 A | 9/2010 |
| JP | 2011-78237 A | 4/2011 |
| JP | 2011-101523 A | 5/2011 |
| JP | 2011-103740 A | 5/2011 |
| JP | 2011-109784 A | 6/2011 |
| JP | 2012-65516 A | 3/2012 |
| JP | 2012-228027 A | 11/2012 |
| JP | 2013-81289 A | 5/2013 |
| JP | 2013-169083 A | 8/2013 |
| WO | 2011/058405 A1 | 5/2011 |
| WO | 2011/162025 A1 | 12/2011 |
| WO | 2011/162722 A1 | 12/2011 |
| WO | 2012/144358 A1 | 10/2012 |
| WO | 2012/162570 A1 | 11/2012 |
| WO | 2013/012831 A2 | 1/2013 |

OTHER PUBLICATIONS

International Search Report in PCT Application No. PCT/JP2014/074572, dated Dec. 9, 2014.

Written Opinion in PCT Application No. PCT/JP2014/074572, dated Dec. 9, 2014.

\* cited by examiner

CHARGING FACILITY AND ENERGY MANAGEMENT METHOD FOR CHARGING FACILITY

RELATED APPLICATIONS

The present application is a continuation of U.S. application Ser. No. 14/917,948 filed Mar. 10, 2016, which is a National Phase of PCT/JP2014/074572 filed Sep. 17, 2014, and claims priority based on Japanese Patent Application No. 2013-194491 filed on Sep. 19, 2013.

TECHNICAL FIELD

The present invention relates to a fast charging facility for an electric vehicle linked with a power generation device, such as a solar power generation module, or a charging/discharging device, such as a fixed storage battery, and can be suitably applied to an energy management method for each device associated with the charging facility.

BACKGROUND ART

At the time of fast charging of an electric vehicle, power which is consumed at the time of traveling of the electric vehicle should be supplied in a comparatively short charging time. In other words, a large load is applied to a so-called system power supply, that is, a power facility which supplies commercial power, in inverse proportion to the shortness of the charging time of the electric vehicle.

In addition, since the time zone during which fast charging of the electric vehicle is required depends on the life pattern of a driver, hereafter, if the electric vehicles become more popular, fast charging may be intensively performed according to the season, a day of the week, a time zone, or the like. Accordingly, controlling smoothing power demand for a short period of time due to fast charging and limiting the power demand peak for a system power supply is required.

As a method therefor, a technique in which each of a plurality of devices including a power generation device, such as a solar power generation device, or a storage device, such as a fixed storage battery, in addition to the system power supply are used in combination is known.

In relation to the above, PTL 1 (WO2011/162025) discloses a technique relating to a DC power distribution system. The DC power distribution system described in PTL 1 includes a DC power distribution system, a first power conversion device, a second power conversion device, and a third power conversion device. The DC power distribution system supplies DC power to a load device. The first power conversion device performs voltage conversion of generated power of a solar power generation device and supplies power to the DC power distribution system. The second power conversion device performs voltage conversion between a first power storage device always connected to the DC power distribution system and the DC power distribution system, and supplies power from one side to the other side. The third power conversion device performs power conversion between an AC system and the DC power distribution system, and supplies power from one side to the other side. The DC power distribution system includes an operation mode setting unit and an operation control unit. The operation mode setting unit determines an operation mode according to operation mode determination information for setting an operation mode of the DC power distribution system. The operation control unit sets a first control parameter for the second power conversion device and a second control parameter for the third power conversion device according to the operation mode set by the operation mode setting unit. The second power conversion device performs control of a power supply direction, operation start, and operation stop according to the voltage of the DC power distribution system and the first control parameter. The third power conversion device performs control of a power supply direction, operation start, and operation stop according to the voltage of the DC power distribution system and the second control parameter.

In the DC power distribution system described in PTL 1, first, a storage device of a charging facility is charged with power supplied from a plurality of power supply devices, and then, power charged in the storage device is discharged to charge the electric vehicle. For this end, it is necessary to appropriately control the timing at which the storage device is charged or discharged, the timing at which a plurality of power supply devices, such as a system power supply or a power generation device, supply power to a storage battery, or the like.

CITATION LIST

Patent Literature

[PTL 1] WO2011/162025

SUMMARY OF INVENTION

The invention provides a fast charging facility for an electric vehicle which has a simple configuration and allows flexible operation while a power generation device and a storage device are combined with a system power supply, and an energy management method for the charging facility.

Other objects and novel features will become apparent from the description of this specification and the accompanying drawings.

According to one embodiment, a charging facility transforms power supplied from a plurality of power supply devices and a storage device with power converters, collects power in a DC bus, and then, uses power to charge an electric vehicle. In an energy management method for a charging facility, each power converter operates under independent automatic control according to a change in voltage in the DC bus.

According to one embodiment described above, an upper-level control unit which collectively controls a plurality of power supply sources is not required, a plurality of power supply devices can be combined with a simple configuration achieved by merely connecting respective output terminals to the DC bus. In addition, the entire charging facility can be operated flexibly.

DESCRIPTION OF EMBODIMENTS

A mode for carrying out a charging facility and an energy management method for a charging facility according to the invention will be described below referring to the accompanying drawings.

Embodiment

In an embodiment of the invention, one configuration example of a charging facility in which a plurality of power converters are connected to a DC bus will be described.

Each of a plurality of power converters can be broadly classified into three types. The power converters included in the first classification convert AC power supplied from the outside, such as a system power supply, to DC power and supply the DC power to the DC bus. The power converter included in the second classification supply power generated by a power generation device, such as a solar power generation module, to the DC bus. The power converters included in the third classification receive power from the DC bus to charge the storage device. The power converters included in the third classification also discharge power charged in the storage device and supply power to the DC bus.

The charging facility described herein is connected to a system power supply, and has one power generation device and one storage device. However, the number of devices is just an example, and is not intended to limit the invention. the details will be described below, the presence or absence of connection to the system power supply, or the number of connected power generation devices or storage devices is not particularly limited, and in some cases, even if any one of the system power supply, the power generation device, and the storage device is not linked, operation can be continued by a combination of the remaining devices.

Figure 1:
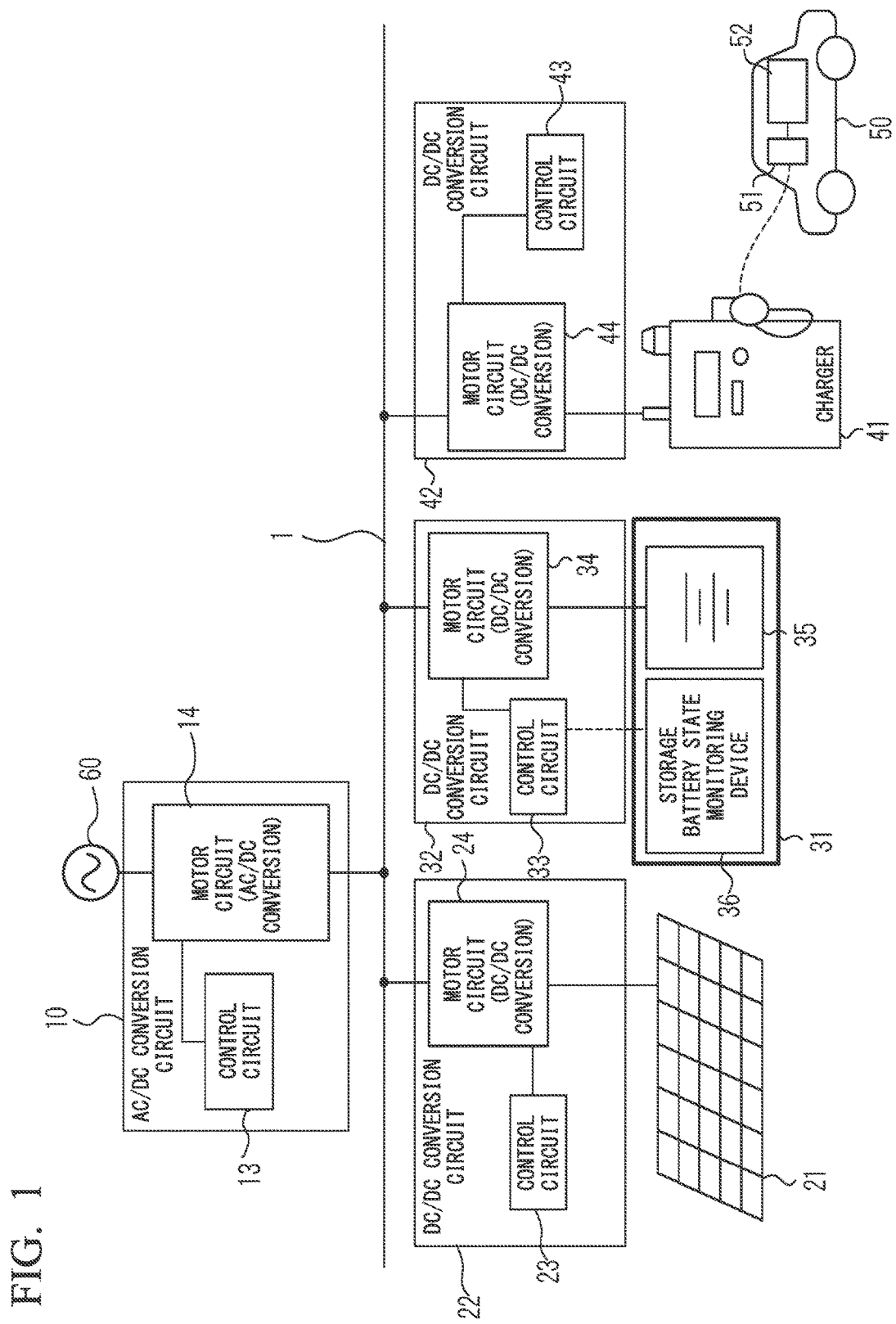
FIG. 1 is a block circuit diagram showing a configuration example of a charging facility according to an embodiment of the invention.

FIG. 1 is a block circuit diagram showing a configuration example of the charging facility according to the embodiment of the invention. The components of the charging facility shown in FIG. 1 will be described.

The charging facility shown in FIG. 1 includes a DC bus 1, an alternative current (AC)/direct current (DC) conversion circuit 10 for a system power supply which receives power from a system power supply 60, a solar power generation module 21, a DC/DC conversion circuit 22 for a power generation device, a fixed storage battery 31, a DC/DC conversion circuit 32 for a storage device, a rechargeable battery 41, and a DC/DC conversion circuit 42 for a charging device for use in an electric vehicle.

The AC/DC conversion circuit 10 for a system power supply which receives power from the system power supply 60 and converts power to a DC voltage includes an AC/DC converter control circuit 13 for a system power supply and an AC/DC converter motor circuit 14 for a system power supply. The DC/DC conversion circuit 22 for a power generation device includes a DC/DC converter control circuit 23 for a power generation device and a DC/DC converter motor circuit 24 for a power generation device. The DC/DC conversion circuit 22 for a power generation device and the solar power generation module 21 may be collectively referred to as a power generation system. The DC/DC conversion circuit 32 for a storage device includes a DC/DC converter control circuit 33 for a storage device and a DC/DC converter motor circuit 34 for a storage device. The fixed storage battery 31 includes a storage battery cell 35 and a storage battery state monitoring device 36. The DC/DC conversion circuit 32 for a storage device and the fixed storage battery 31 may be collectively referred to as a storage system. The DC/DC conversion circuit 42 for a charging device includes a DC/DC converter control circuit 43 for a charging device and a DC/DC converter motor circuit 44 for a charging device. The DC/DC conversion circuit 42 for a charging device and the rechargeable battery 41 may be collectively referred to as a charging system. The motor circuit of each conversion circuit functions as a DC power generation device which generates DC power.

FIG. 1 also shows an electric vehicle 50, an on-board charging circuit 51, an on-board rechargeable battery 52, and a system power supply 60. The on-board charging circuit 51 and the on-board rechargeable battery 52 are included in the electric vehicle 50.

Though not shown in FIG. 1, the DC bus 1 includes a positive voltage bus to which a positive voltage is applied, and a negative voltage bus to which a negative voltage is applied. This configuration is just an example, and for example, a ground may be used instead of the negative bus. The solar power generation module 21 is just an example, and for example, a wind power generation module may be used instead.

The functions of the components of the charging facility shown in FIG. 1 will be described. Power received from the system power supply 60 is converted from an AC voltage to a DC voltage by the AC/DC conversion circuit 10 for a system power supply, and is supplied to the DC bus 1.

The power generation system transforms (DC/DC conversion) power generated by the solar power generation module 21 with the DC/DC conversion circuit 22 for a power generation device, and supplies power to the DC bus 1.

In regard to the storage system, charging power is supplied from the DC bus 1 to the fixed storage battery 31 by the DC/DC conversion circuit 32 for a storage device, and discharging power is supplied from the fixed storage battery 31 to the DC bus 1.

In regard to the charging system, power requested by the on-board charging circuit 51 is supplied from the DC bus 1 according to the remaining amount of the on-board rechargeable battery 52 of the electric vehicle 50, thereby charging the on-board rechargeable battery 52.

The operation of the charging facility according to the embodiment of the invention, that is, the energy management method for a charging facility according to the embodiment of the invention will be described in more detail.

The charging facility and the energy management method for a charging facility according to the embodiment of the invention have the following three features. The first feature is that peak cutting of received power from the system power supply 60 can be performed without limiting charging power to the electric vehicle 50. Peak cutting of received power is performed, whereby it is possible to reduce a basic charge of electricity charges. The second feature is that the most of renewable energy, such as power by solar power generation, is usable. The third feature is that power loss in the power converters can be reduced.

Accordingly, in the embodiment of the invention, charging of the on-board rechargeable battery 52 is performed with the following priority. That is, first, power supplied from the power generation system is used. If power supplied from the power generation system is insufficient, power supplied from the system power supply 60 is additionally used. In order to realize peak cutting of system received power, an upper limit value is set for power received from the system power supply 60. For this reason, if power supplied from the power generation system and the system power supply 60 is yet insufficient, power supplied by discharging of the storage system is additionally used.

In the embodiment of the invention, charging of the storage system is performed using the following priority. That is, in a case where the remaining amount of charge of the fixed storage battery 31 has some margin, charging of the fixed storage battery 31 is performed only using power supplied from the power generation system. In a case where the remaining amount of charge of the fixed storage battery 31 is smaller than a predetermined reference value, charging of the fixed storage battery 31 is performed in a short period of time using power supplied from the system power supply 60 in combination with power supplied from the power generation system.

The above control is performed by the respective power converters of the system power supply 60, the power generation system, the storage system, and the charging system individually, that is, independently from other power converters. Specifically, for example, the AC/DC converter control circuit 13 for a system power supply monitors the voltage of the DC bus 1, and the AC/DC converter control circuit 13 for a system power supply controls the operation of the AC/DC converter motor circuit 14 for a system power supply based on the result of monitoring, whereby the operation of the AC/DC conversion circuit 10 for a system power supply connected to the system power supply 60 is performed. At this time, control which is performed by the AC/DC converter control circuit 13 for a system power supply has no relation to the power generation system, the storage system, and the charging system. The same applies to the operation of the power generation system, the storage system, and the charging system.

In other words, the charging facility according to the invention collects power supplied from the AC/DC conversion circuit 10 for a system power supply, the power generation system, and the storage system in the DC bus 1 in the form of DC power, and charges the on-board rechargeable battery 52 of the electric vehicle 50 with DC power collected in the DC bus 1. In the charging facility according to the invention, controlling fixing the DC voltage in the DC bus 1 is not performed, and fluctuation of the DC voltage in the DC bus 1 is used as a trigger on which the AC/DC conversion circuit 10 for a system power supply, the power generation system, the storage system, and the charging system perform automatic control individually.

Figure 2:
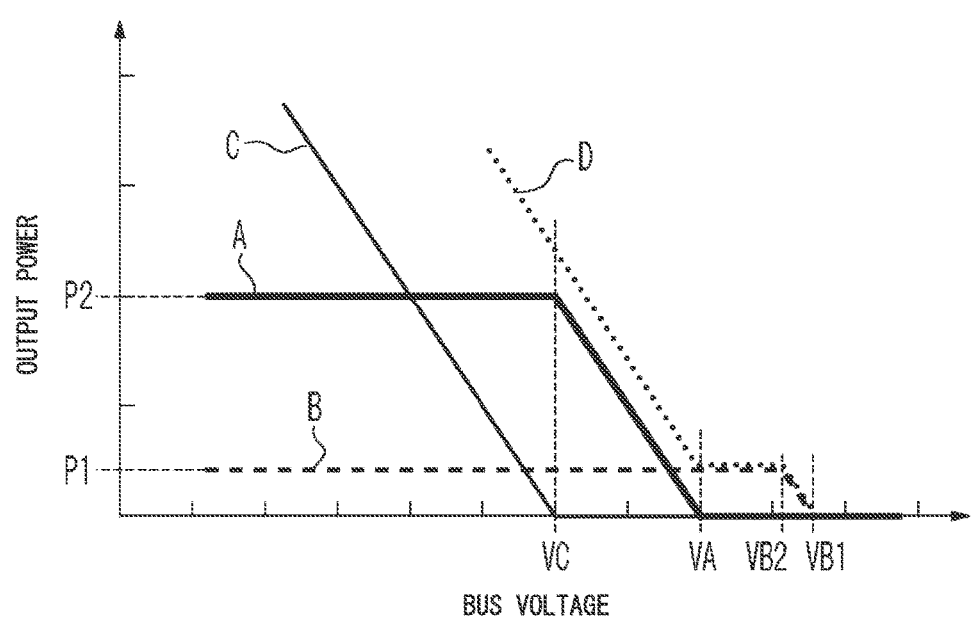
FIG. 2 is a graph showing an example of an energy management method for a charging facility according to an embodiment of the invention.

An example of the overall operation of the charging facility shown in FIG. 1 will be described referring to FIG. 2. FIG. 2 is a graph showing an example of the energy management method for a charging facility according to the embodiment of the invention.

FIG. 2 includes four graphs in total of a first graph (A) to a fourth graph (D). In each of the first graph (A) to the fourth graph (D), the vertical axis indicates the voltage of the DC bus 1, and the horizontal axis indicates output power of the DC bus 1.

The first graph (A) indicates the relationship between power supplied from the AC/DC conversion circuit 10 for a system power supply to the DC bus 1 and the voltage of the DC bus 1. The second graph (B) indicates the relationship between power supplied from the DC/DC conversion circuit 22 for a power generation device to the DC bus 1 and the voltage of the DC bus 1. The third graph (C) indicates the relationship between power supplied from the DC/DC conversion circuit 32 for a storage device to the DC bus 1 and the voltage of the DC bus 1. The fourth graph (D) indicates the relationship between a load applied from the DC/DC conversion circuit 42 for a charging device to the DC bus 1 to the voltage of the DC bus 1.

In the vertical axis of the graph shown in FIG. 2, P1 is maximum output power determined by the rating of the DC/DC conversion circuit 22 for a power generation device, and P2 is an upper limit set value of power received from the AC/DC conversion circuit 10 for a system power supply.

In the horizontal axis of the graph shown in FIG. 2, VA is a set voltage for a system power supply, VB1 is a first set voltage for a power generation device, VB2 is a second set voltage for a power generation device, and VC is a set voltage for a storage device. The set voltage VA for a system power supply is set in the AC/DC converter control circuit 13 for a system power supply of the AC/DC conversion circuit 10 for a system power supply. The first set voltage VB1 for a power generation device and the second set voltage VB2 for a power generation device are set in the DC/DC converter control circuit 23 for a power generation device of the power generation system. The set voltage VC for a storage device is set in the DC/DC converter control circuit 33 for a storage device of the storage system. In the example of FIG. 2, the set voltage VC for a storage device is set to be lower than the set voltage VA for a system power supply, the set voltage VA for a system power supply is set to be lower than the second set voltage VB2 for a power generation device, and the second set voltage VB2 for a power generation device is set to be lower than the first set voltage VB1 for a power generation device.

Specifically, for example, in the AC/DC conversion circuit 10 for a system power supply, the AC/DC converter control circuit 13 for a system power supply continuously monitors the voltage of the DC bus 1, and if the voltage of the DC bus 1 exceeds the set voltage VA for a system power supply, the AC/DC converter control circuit 13 for a system power supply controls the AC/DC converter motor circuit 14 for a system power supply and stops power supply from the AC/DC conversion circuit 10 for a system power supply to the DC bus 1. On the contrary, if the voltage of the DC bus 1 falls below the set voltage VA for a system power supply, the AC/DC converter control circuit 13 for a system power supply controls the AC/DC converter motor circuit 14 for a system power supply and supplies power from the system power supply 60 to the DC bus 1.

Similarly, in the power generation system, the DC/DC converter control circuit 23 for a power generation device continuously monitors the voltage of the DC bus 1, and if the voltage of the DC bus 1 exceeds the first set voltage VB1 for a power generation device, the DC/DC converter control circuit 23 for a power generation device controlling stopping power supply to the DC bus 1 of the DC/DC converter motor circuit 24 for a power generation device. On the contrary, if the voltage of the DC bus 1 falls below the first set voltage VB1 for a power generation device, the DC/DC converter control circuit 23 for a power generation device controlling starting of the operation of the DC/DC converter motor circuit 24 for a power generation device. When the voltage of the DC bus 1 decreases from VB1, power supplied from the power generation system to the DC bus 1 increases, and maximum generated power is supplied at a voltage equal to or lower than VB2. In the storage system, the DC/DC converter control circuit 33 for a storage device continuously monitors the voltage of the DC bus 1, and if the voltage of the DC bus 1 exceeds the set voltage VC for a storage device, the DC/DC converter control circuit 33 for a storage device controlling stopping of the power supply to the DC bus 1 of the DC/DC converter motor circuit 34 for a storage device. On the contrary, if the voltage of the DC bus 1 falls below the set voltage VC for a storage device, the DC/DC converter control circuit 33 for a storage device controlling starting of the discharging operation of the DC/DC converter motor circuit 34 for a storage device.

In the example of FIG. 2, first, the charging facility is activated from a state where the voltage of the DC bus 1 is zero as an initial condition. From this state, the AC/DC conversion circuit 10 for a system power supply starts to operate, and increases the voltage of the DC bus 1 to be stabilized at the set voltage VA for a system power supply. Thereafter, the power generation system and the storage system start to operate. In a case where the amount of charge of the fixed storage battery 31 reaches an upper limit, the voltage of the DC bus 1 increases with generated power of the power generation system, and if the voltage of the DC bus 1 exceeds the first set voltage VB1 for a power generation device, the power generation system stops power supply to the DC bus 1. That is, in a state where the voltage of the DC bus 1 exceeds the first set voltage VB1 for a power generation device, since the first set voltage VB1 for a power generation device is set to be higher than the set voltage VA for a system power supply and the set voltage VC for a storage device, controlling stopping of the entire power supply to the DC bus 1 is performed.

Next, the on-board rechargeable battery 52 of the electric vehicle 50 is connected to the rechargeable battery 41 through the on-board charging circuit 51, and if charging of the fixed storage battery 31 starts, a load applied to the DC bus 1 increases, and when the load increases, the voltage of the DC bus 1 decreases.

If the voltage of the DC bus 1 falls below the first set voltage VB1 for a power generation device, the DC/DC converter control circuit 23 for a power generation device which monitors the voltage of the DC bus 1 detects this state, and performs control such that the DC/DC converter motor circuit 24 for a power generation device starts to operate.

If the operation starts, the DC/DC converter motor circuit 24 for a power generation device receives DC power generated by solar power generation of the solar power generation module 21, converts the DC voltage of power, and supplies power to the DC bus 1. Since the presence or absence of supply or the supply amount of generated power to the DC bus 1 is determined by the DC/DC conversion circuit 22 for a power generation device based on the voltage of the DC bus 1, the solar power generation module 21 may continuously continue solar power generation without particular control.

Hereinafter, until the voltage of the DC bus 1 reaches the set voltage VA for a system power supply, charging of the on-board rechargeable battery 52 is performed with power supplied from the power generation system to the DC bus 1.

Generated power supplied from the power generation system to the DC bus 1 increases when the voltage of the DC bus 1 decreases. Generated power of the power generation system reaches maximum generated power of the power generation device when the voltage of the DC bus 1 decreases and reaches the second set voltage VB2 for a power generation device.

If the voltage of the DC bus 1 decreases and reaches the set voltage VA for a system power supply, the AC/DC converter control circuit 13 for a system power supply which monitors the voltage of the DC bus 1 detects this state, and the AC/DC converter motor circuit 14 for a system power supply starts power supply to the DC bus 1.

The AC/DC converter motor circuit 14 for a system power supply receives AC power of a system from the system power supply 60. The AC/DC converter motor circuit 14 for a system power supply converts input AC power to DC power and supplies DC power to the DC bus 1.

Hereinafter, until the voltage of the DC bus 1 reaches the set voltage VC for a storage device, charging of the on-board rechargeable battery 52 is performed with the total sum of power supplied from the power generation system and the AC/DC conversion circuit 10 for a system power supply to the DC bus 1.

Power supplied from the AC/DC conversion circuit 10 for a system power supply to the DC bus 1 increases when the voltage of the DC bus 1 decreases. In this example, when power output from the AC/DC conversion circuit 10 for a system power supply reaches the maximum power P2 which is an upper limit set value of received power, a voltage that the voltage of the DC bus 1 reaches is set in the DC/DC converter control circuit 33 for a storage device as the set voltage VC for a storage device. In other words, the set voltage VC for a storage device is set such that output power from the AC/DC conversion circuit 10 for a system power supply reaches the maximum power P2, and the storage system starts power supply to the DC bus 1.

If the voltage of the DC bus 1 decreases and reaches the set voltage VC for a storage device, the DC/DC converter control circuit 33 for a storage device which monitors the voltage of the DC bus 1 detects this state, and performs control such that the DC/DC converter motor circuit 34 for a storage device starts the discharging operation.

If the discharging operation starts, the DC/DC converter motor circuit 34 for a storage device receives DC power charged in advance in the fixed storage battery 31, changes the voltage of DC power, and supplies DC power to the DC bus 1. That is, DC power discharged from the fixed storage battery 31 is supplied to the DC bus 1 through the DC/DC converter motor circuit 34 for a storage device.

Hereinafter, while the voltage of the DC bus 1 is lower than the set voltage VC for a storage device, charging of the on-board rechargeable battery 52 is performed with the total sum of the maximum power P1 which can be supplied from the power generation system, the maximum power P2 which can be supplied from the AC/DC conversion circuit 10 for a system power supply, and discharging power supplied from the storage system.

The set voltage VA for a system power supply, the first set voltage VB1 for a power generation device, the second set voltage VB2 for a power generation device, and the set voltage VC for a storage device, the inclination of the graph representing the relationship between power and the voltage of the DC bus 1 set in each of the AC/DC conversion circuit 10 for a system power supply, the power generation system, and the storage system, and the like can be adjusted within a predetermined range in the AC/DC converter control circuit 13 for a system power supply, the DC/DC converter control circuit 23 for a power generation device, the DC/DC converter control circuit 33 for a storage device, and the like. The adjustment is appropriately performed, whereby it is possible to freely determine the priority of the respective power converters which supply power to the load applied to the DC bus 1.

A charging operation of the fixed storage battery 31 in the storage system will be described. While the voltage of the DC bus 1 has a value higher than the set voltage VC for a storage device, that is, while the fixed storage battery 31 is not discharging, charging of the fixed storage battery 31 can be performed in parallel with charging of the on-board rechargeable battery 52.

Charging of the fixed storage battery 31 can be performed in two operation modes. First, in a case where the remaining amount of charge of the fixed storage battery 31 is equal to or greater than a predetermined reference amount of charge set in advance, for example, equal to or greater than 50%, charging is performed only with power supplied from the power generation system without using power of the AC/DC conversion circuit 10 for a system power supply. The determination is performed by the storage battery state monitoring device 36 monitoring the remaining amount of charge of the storage battery cell 35.

Next, in a case where it is determined that the remaining amount of charge of the fixed storage battery 31 is smaller than the reference amount of charge, for example, less than 50%, charging is performed in a short period of time using power supplied from the AC/DC conversion circuit 10 for a system power supply as well as power supplied from the power generation system. At this time, power supplied from the system power supply 60 is equal to or less than the upper limit set value of received power.

In a case where the amount of charge of the fixed storage battery 31 reaches the upper limit value and where the voltage of the DC bus 1 is equal to or higher than the set voltage VC for a storage device, the DC/DC converter control circuit 33 for a storage device controlling stopping of the power supply to both of the fixed storage battery 31 and the DC bus 1 of the DC/DC converter motor circuit 34 for a storage device.

Figure 3:
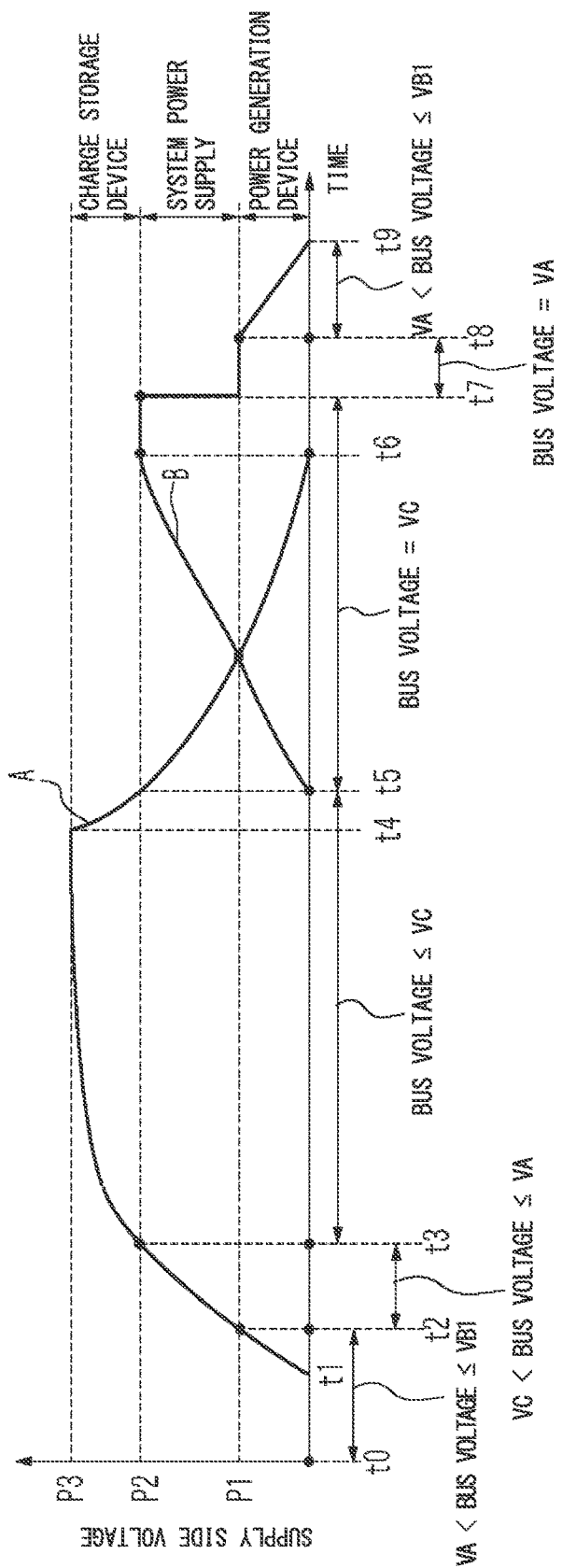
FIG. 3 is a graph showing another example of an energy management method for a charging facility according to an embodiment of the invention.

Another example of the overall operation of the charging facility shown in FIG. 1 will be described referring to FIG. 3. FIG. 3 is a graph showing another example of the energy management method for a charging facility according to the embodiment of the invention.

The graph shown in FIG. 3 includes a first graph (A) and a second graph (B). In each of the first graph (A) and the second graph (B), the horizontal axis indicates time, and the vertical axis indicates power supply-side power.

The first graph (A) indicates an example of variation with time in power supplied from the DC bus 1 to the on-board rechargeable battery 52 of the electric vehicle 50. The second graph (B) indicates an example of variation with time in power supplied from the DC bus 1 to the fixed storage battery 31.

In the horizontal axis of the graph shown in FIG. 3, a period from the time t0 to the time t2 indicates a period during which the voltage of the DC bus 1 is higher than the set voltage VA for a system power supply and equal to or lower than the first set voltage VB1 for a power generation device. A period from the time t2 to the time t3 indicates a period during which the voltage of the DC bus 1 is higher than the set voltage VC for a storage device and equal to or lower than the set voltage VA for a system power supply. A period from the time t3 to the time t5 is a period during which the voltage of the DC bus 1 is equal to or lower than the set voltage VC for a storage device. A period from the time t5 to the time t7 is a period during which the voltage of the DC bus 1 is equal to the set voltage VC for a storage device. A period from the time t7 to the time t8 is a period during which the voltage of the DC bus 1 is equal to the set voltage VA for a system power supply. A period from the time t8 to the time t9 is a period during which the voltage of the DC bus 1 is equal to or higher than the set voltage VA for a system power supply and equal to or lower than the first set voltage VB1 for a power generation device. The set voltage VA for a system power supply, the first set voltage VB1 for a power generation device, and the set voltage VC for a storage device are the same as those in the description relating to FIG. 2.

In the vertical axis of the graph shown in FIG. 3, power P1 indicates maximum power which can be supplied from the power generation system. Power P2 indicates the total sum of maximum power which can be supplied from the power generation system and maximum power which can be supplied from the AC/DC conversion circuit 10 for a system power supply. Power P3 indicates the total sum of maximum power which can be supplied from the power generation system, maximum power which can be supplied from the AC/DC conversion circuit 10 for a system power supply, and maximum power which can be supplied at the time of discharging the storage system. The maximum power which can be supplied from each of the AC/DC conversion circuit 10 for a system power supply, the power generation system, and the storage system is the same as that in the description relating to FIG. 2.

In the example of FIG. 3, in the charging facility according to the embodiment of the invention, the situation of the variation with time in power supply and demand of each device will be described.

First, from the time t0 to the time t1, charging of the electric vehicle 50 is not performed, and the storage battery cell 35 is charged to an upper limit of capacity. During this period, the voltage of the DC bus 1 is higher than the set voltage VA for a system power supply and equal to or lower than the first set voltage VB1 for a power generation device.

Next, at the time t1, charging of the electric vehicle 50 starts. Thereafter, at the time t2, until the power supply-side power reaches the power P1, charging of the electric vehicle 50 is performed with power supplied from the DC/DC conversion circuit 22 for a power generation device to the DC bus 1 according to the voltage of the DC bus 1. From the time t1 to the time t2, the voltage of the DC bus 1 is higher than the set voltage VA for a system power supply and equal to or lower than the first set voltage VB1 for a power generation device.

Next, at the time t2, as described above, the supply-side power reaches the power P1. Charging of the electric vehicle 50 continues and is performed by the maximum generated power of the DC/DC conversion circuit 22 for a power generation device and received power from the system power supply 60. The supply-side power continues to increase and reaches power P2 at the time t3. From the time t2 to the time t3 during which the supply-side power is equal to or greater than the power P1 and less than the power P2, the voltage of the DC bus 1 is higher than the set voltage VC for a storage device and equal to or lower than the set voltage VA for a system power supply.

Next, at the time t3, as described above, the supply-side power reaches the power P2. Charging of the electric vehicle 50 continues and is performed with the maximum generated power of the DC/DC conversion circuit 22 for a power generation device, the upper limit value of received power from the system power supply 60, and discharging power of the DC/DC conversion circuit 32 for a storage device. At this time, discharging power of the DC/DC conversion circuit 32 for a storage device is determined according to the voltage of the DC bus 1. The supply-side power continues to increase and reaches power P3 at the time t4. From the time t3 to the time t4 during which the supply-side power is equal to or greater than the power P2 and less than the power P3, the voltage of the DC bus 1 is equal to or lower than the set voltage VC for a storage device.

Next, at the time t4, as described above, the supply-side power reaches the power P3. While charging of the electric vehicle 50 continues and is performed with the maximum generated power of the DC/DC conversion circuit 22 for a power generation device, the upper limit value of received power from the system power supply 60, and discharging power of the DC/DC conversion circuit 32 for a storage device, the amount of charge of the electric vehicle 50 approaches a full charge state, charging power is started to be restricted. Thereafter, at the time t5, the supply-side power reaches the power P2. From the time t4 to the time t5 during which the supply-side power is equal to or less than the power P3 and greater than the power P2, the voltage of the DC bus 1 is equal to or lower than the set voltage VC for a storage device.

Next, at the time t5, as described above, the supply-side power reaches the power P2. While charging of the electric vehicle 50 continues, the amount of charge of the electric vehicle 50 further approaches the full charge state, and charging power is restricted. When the supply-side power is less than the power P2 and equal to or greater than the power P1, the DC/DC conversion circuit 32 for a storage device discharges, and the amount of charge decreases, the electric vehicle 50 and the storage battery cell 35 are charged with the maximum generated power of the DC/DC conversion circuit 22 for a power generation device and received power from the system power supply 60. Thereafter, at the time t6, charging of the electric vehicle 50 ends. From the time t5 to the time t6 during which the supply-side power is less than the power P2, the voltage of the DC bus 1 is equal to the set voltage VC for a storage device. Charging power of the storage battery cell 35 is controlled by the DC/DC converter control circuit 33 for a storage device which monitors the voltage of the DC bus 1 such that the voltage of the DC bus 1 does not fall below the set voltage VC for a storage device.

Next, at the time t6, as described above, charging of the electric vehicle 50 ends. When the storage battery cell 35 is discharged and the amount of charge decreases, the storage battery cell 35 is charged with the maximum generated power of the DC/DC conversion circuit 22 for a power generation device and received power from the system power supply 60. Charging power of the storage battery cell 35 is controlled by the DC/DC converter control circuit 33 for a storage device which monitors the voltage of the DC bus 1 such that the voltage of the DC bus 1 does not fall below the set voltage VC for a storage device.

Next, at the time t7, the amount of charge of the storage battery cell 35 reaches a value set in advance. Thereafter, until the time t8 when the amount of charge of the storage battery cell 35 approaches the full charge state, charging of the storage battery cell 35 is performed only with the maximum generated power of the DC/DC conversion circuit 22 for a power generation device. From the time t7 to the time t8, the voltage of the DC bus 1 is equal to the set voltage VA for a system power supply.

Next, at the time t8, if the amount of charge of the storage battery cell 35 approaches the full charge state, the DC/DC conversion circuit 32 for storage device starts to restrict charging power. For this reason, the voltage of the DC bus 1 increases, and power supply from the DC/DC conversion circuit 22 for a power generation device is restricted. Thereafter, at the time t9, while the amount of charge of the storage battery cell 35 reaches the full charge state, the voltage of the DC bus 1 is higher than the set voltage VA for a system power supply and equal to or lower than the first set voltage VB1 for a power generation device.

The charging facility and the energy management method for a charging facility according to the embodiment of the invention described above have the following features.

First, each of the AC/DC conversion circuit 10 for a system power supply, the DC/DC conversion circuit 22 for a power generation device, and the DC/DC conversion circuit 32 for a storage device autonomously performs an independent operation under automatic control only based on the voltage fluctuating in the DC bus 1. Accordingly, an upper-level control device which manages the entire charging facility is not required, and the configuration as the whole of the charging facility is simplified.

Furthermore, even if a part of power converters fails, operation with the remaining power converters which are operating normally can be continued, and it is easy to remove the failed power converters from the DC bus 1, to additionally connect different power converters to the DC bus 1. That is, the charging facility according to the invention allows very flexible operation.

Although the invention made by the inventors has been concretely described based on the embodiment, the present invention is not limited to the above-described embodiment and can be variously modified without departing from the spirit or scope of the invention. In addition, it is possible to freely combine the features described in the embodiment as long as the technical contradiction does not occur.

This application claims claims priority based on Japanese Patent Application No. 2013-194491, the disclosure of which is incorporated herein by reference.

In connection with the above, the following matters are disclosed.

[1] An energy management method for a charging facility including detachably connecting an external rechargeable battery to a charging circuit;

supplying DC power to a DC bus; and charging the external rechargeable battery with the DC power supplied to the DC bus;

wherein the supplying of the DC power includes generating the DC power with a plurality of power converters, monitoring the DC voltage in the DC bus in each power converter, and controlling the operation of each power converter based on the DC voltage monitored by each power converter independently from the remaining power converters of the plurality of power converters; and the charging of the external rechargeable battery includes converting the DC power supplied to the DC bus to DC power for charging by a DC/DC converter motor circuit for a charging device, monitoring the DC voltage in the DC bus, and controlling the operation of the DC/DC converter motor circuit for a charging device based on a comparison result of the monitored DC voltage and a predetermined set voltage.

[2] The energy management method for a charging facility described in [1], wherein the generating of the DC power includes generating DC power with a power generation module, and converting the generated DC power to the DC power by a DC/DC converter motor circuit for a power generation device; and the independently controlling includes controlling the operation of the DC/DC converter motor circuit for a power generation device according to the result of monitoring.

[3] The energy management method for a charging facility described in [1] or [2], the energy management method further including receiving DC power from the DC bus and converting the received DC power to the DC power to charge a storage battery, wherein the generating of the DC power includes discharging DC power charged in advance in the storage battery, and converting the discharged DC power to the DC power and supplying the DC power to the DC bus by a DC/DC converter motor circuit for a storage device; and the independently controlling includes controlling power supply to the DC bus or the storage battery of the DC/DC converter motor circuit for a storage device according to the result of monitoring.

[4] The energy management method for a charging facility described in [2], wherein the independently controlling includes starting supply of the DC power to the DC bus of the power generation module if the monitored DC voltage is equal to or lower than a predetermined set voltage for a power generation device, and stopping supply of the DC power to the DC bus of the power generation module if the monitored DC voltage is equal to or higher than the set voltage for a power generation device.

[5] The energy management method for a charging facility described in [3], wherein the independently controlling includes starting supply of the DC power to the DC bus of the DC/DC converter motor circuit for a storage device if the monitored DC voltage is equal to or lower than a predetermined set voltage for a storage device, starting supply of the DC power to the storage battery of the DC/DC converter motor circuit for a storage device if the monitored DC voltage is equal to or higher than the set voltage for a system power supply, starting supply of the DC power to the storage battery of the DC/DC converter motor circuit for a storage device if the monitored DC voltage is equal to or higher than the set voltage for a storage device and equal to or lower than the set voltage for a system power supply and if the monitored remaining amount of charge is smaller than a predetermined reference amount of charge, and stopping power supply to both of the storage battery and the DC bus of the DC/DC converter motor circuit for a storage device if the monitored DC voltage is equal to or higher than the set voltage for a storage device and equal to or lower than the set voltage for a system power supply and if the monitored remaining amount of charge is greater than a predetermined reference amount of charge.

[6] The energy management method for a charging facility described in [5], wherein the set voltage for a storage device is lower than the set voltage for a system power supply, and the set voltage for a system power supply is lower than the set voltage for a power generation device.

[7] The energy management method for a charging facility described in [2] or [4], wherein the generating of power includes performing solar power generation or performing wind power generation.

The invention claimed is:

1. A charging facility comprising:

a direct current (DC) bus;

a plurality of power converters configured to supply DC power to the DC bus; and a charging device configured to charge a vehicle-mounted rechargeable battery with the DC power supplied to the DC bus, wherein each of the plurality of power converters comprises:

a DC power generator configured to generate the DC power; and a power controller configured to monitor a DC voltage in the DC bus, determine a priority of operation of the plurality of the power converters based on the comparison result of the monitored DC voltage and a predetermined set voltage, and independently control operation of each of the DC power generators based on the priority of operation, and the charging device comprises:

a DC/DC converter configured to convert the DC power supplied to the DC bus to DC power for charging; and a charging controller configured to control the operation of the DC/DC converter.

2. The charging facility according to claim 1, wherein the DC power generator is configured to start supply of the DC power to the DC bus in response to the monitored DC voltage being lower than the predetermined set voltage.

3. The charging facility according to claim 2, wherein the plurality of power converters comprises:

a system power supply converter configured to convert alternating current (AC) power received from a system to DC power and supply the DC power to the DC bus, and a storage system configured to supply DC power discharged from a storage battery charged in advance to the DC bus.

4. The charging facility according to claim 3, wherein the system power supply converter comprises:

an AC/DC converter for a system power supply configured to function as the DC power generator and to convert the AC power to the DC power and supply the DC power to the DC bus; and a system power supply controller configured to function as the power controller which is configured to monitor a DC voltage in the DC bus and to control the operation of the AC/DC converter for a system power supply to start supply of the DC power to the DC bus in response to the monitored DC voltage being lower than a set voltage for a system power supply.

5. The charging facility according to claim 4, wherein the storage system comprises:

the storage battery;

a DC/DC converter for a storage device configured to function as the DC power generator which is configured to convert DC power discharged from the storage battery to different DC power and supply the DC power to the DC bus at the time of discharging the storage battery; and a storage device controller configured to function as the power control unit which is configured to monitor a DC voltage in the DC bus and to control the operation of the DC/DC converter for a storage device to start supply of the DC power to the DC bus in response to the monitored DC voltage being lower than a set voltage for a storage device.

6. The charging facility according to claim 5, wherein the plurality of power converters comprises:
a power generation system configured to supply DC power generated by power generation to the DC bus.

7. The charging facility according to claim 6, wherein the power generation system comprises:
a power generation module configured to generate DC power by power generation;
a DC/DC converter for a power generation device configured to function as the DC power generator and to convert the generated DC power to the DC power and supply the DC power to the DC bus; and
a power generation device controller configured to function as the power control unit which is configured to monitor a DC voltage in the DC bus and to control the operation of the DC/DC converter for a power generation device to start supply of the DC power to the DC bus in response to the monitored DC voltage being lower than a set voltage for a power generation device.

8. The charging facility according to claim 7, wherein the power generation module comprises
a solar power generation module or a wind power generation module.

9. The charging facility according to claim 7, wherein the DC/DC converter for a power generation device is configured to operate on a priority basis and the generated power generated by the power generation is supplied to the DC bus and the power supply to the vehicle-mounted rechargeable battery is started.

10. The charging facility according to claim 9, wherein in response to the charge of the vehicle-mounted rechargeable battery by the power supply based on the generated power falling below a threshold value, the AC/DC converter for a system power supply is configured to operate on a priority basis and the received power received from the system is supplied to the DC bus and the power supply to the vehicle-mounted rechargeable battery is continued.

11. The charging facility according to claim 10, wherein in response to the charge of the vehicle-mounted rechargeable battery by the power supply based on the generated power and the received power falling below the threshold value, the DC/DC converter motor circuit for a storage device is configured to operate and the discharged power discharged from the storage device is supplied to the DC bus and the power supply to the vehicle-mounted rechargeable battery is continued.

12. The charging facility according to claim 11, wherein in response to the amount of charge of the storage device decreasing by the discharge of the discharged power, the DC/DC converter motor circuit for a storage device is configured to stop the operation and the generated power and the received power are supplied to the storage device to recover the amount of charge.

13. The charging facility according to claim 2, wherein the plurality of power converters comprises:
a system power supply converter configured to convert AC power received from a system to DC power and supplies the DC power to the DC bus,
a storage system configured to supply DC power discharged from a storage battery charged in advance to the DC bus, and
a power generation system configured to supply DC power generated by power generation to the DC bus.

14. The charging facility according to claim 13, wherein the system power supply converter comprises:
an AC/DC converter for a system power supply configured to function as the DC power generation unit and to convert the AC power to the DC power and supply the DC power to the DC bus; and
a system power supply controller configured to function as the power control unit which is configured to monitor a DC voltage in the DC bus and to control the operation of the AC/DC converter for a system power supply to start supply of the DC power to the DC bus in response to the monitored DC voltage being lower than a set voltage for a system power supply.

15. The charging facility according to claim 14, wherein the storage system comprises:
the storage battery;
a DC/DC converter for a storage device configured to function as the DC power generation unit which is configured to convert DC power discharged from the storage battery to different DC power and supply the DC power to the DC bus at the time of discharging the storage battery; and
a storage device controller configured to function as the power control unit which is configured to monitor a DC voltage in the DC bus and to control the operation of the DC/DC converter for a storage device to start supply of the DC power to the DC bus in response to the monitored DC voltage being lower than a set voltage for a storage device.

16. The charging facility according to claim 15, wherein the power generation system comprises:
a power generation module configured to generate DC power by power generation;
a DC/DC converter for a power generation device configured to function as the DC power generation unit and is configured to convert the generated DC power to the DC power and supply the DC power to the DC bus; and
a power generation device controller configured to function as the power control unit which is configured to monitor a DC voltage in the DC bus and to control the operation of the DC/DC converter for a power generation device to start supply of the DC power to the DC bus in response to the monitored DC voltage being lower than a set voltage for a power generation device.

17. The charging facility according to claim 16, wherein the power generation module comprises
a solar power generation module or a wind power generation module.

18. The charging facility according to claim 16, wherein the DC/DC converter for a power generation device is configured to operate on a priority basis and the generated power generated by the power generation is supplied to the DC bus and the power supply to the vehicle-mounted rechargeable battery is started.

19. The charging facility according to claim 18, wherein in response to the charge of the vehicle-mounted rechargeable battery by the power supply based on the generated power falling below a threshold value, the AC/DC converter for a system power supply is configured to operate on a priority basis and the received power received from the system is supplied to the DC bus and the power supply to the vehicle-mounted rechargeable battery is continued.

20. The charging facility according to claim 19, wherein in response to the charge of the vehicle-mounted rechargeable battery by the power supply based on the generated power and the received power falling below the threshold value, the DC/DC converter motor circuit for a storage device is configured to operate and the discharged power discharged from the storage device is supplied to the DC bus and the power supply to the vehicle-mounted rechargeable battery is continued.

21. The charging facility according to claim 20, wherein in response to the amount of charge of the storage device decreasing by the discharge of the discharged power, the DC/DC converter motor circuit for a storage device is configured to stop the operation and the generated power and the received power are supplied to the storage device to recover the amount of charge.

22. An energy management method for a charging facility comprising the steps of:
supplying direct current (DC) power to a DC bus; and
charging a vehicle-mounted rechargeable battery with the DC power supplied to the DC bus, wherein
the supplying of the DC power comprises:
in a plurality of power converters,
generating the DC power by a DC power generation unit;
monitoring the DC voltage in the DC bus by a power control unit; and
determining priority of operation of the plurality of the power converters based on the comparison result of the monitored DC voltage and a predetermined set voltage, and independently controlling each operation of the DC power generation units based on the priority by the power control unit, and
the charging of the vehicle-mounted rechargeable battery comprises:
converting the DC power supplied to the DC bus to DC power for charging by a DC/DC converter for a charging device; and
controlling the operation of the DC/DC converter for a charging device.

23. The energy management method for a charging facility according to claim 22, wherein
in each of the plurality of power converters,
the DC power generation unit operates to start supply of the DC power to the DC bus in response to the DC monitored voltage being lower than the predetermined set voltage.

24. The energy management method for a charging facility according to claim 23, wherein
the supplying the DC power comprises:
in the plurality of power converters,
converting alternating current (AC) power received from a system to DC power and supplies the DC power to the DC bus; and
supplying DC power discharged from a storage battery charged in advance to the DC bus.

25. The energy management method for a charging facility according to claim 24, wherein
the generating of the DC power comprises:
receiving AC power from the system; and
converting the AC power to the DC power with an AC/DC converter for a system power supply, and
the independently controlling comprises:
controlling the operation of the AC/DC converter for a system power supply according to the monitored DC voltage.

26. The energy management method for a charging facility according to claim 25, the energy management method further comprising:
receiving DC power from the DC bus and converting the received DC power to the DC power to charge a storage battery, wherein
the generating of the DC power comprises:
discharging DC power charged in advance in the storage battery; and
converting the discharged DC power to the DC power and supplying the DC power to the DC bus by a DC/DC converter for a storage device, and
the independently controlling comprises:
controlling power supply to the DC bus or the storage battery of the DC/DC converter for a storage device according to the result of monitoring.

27. The energy management method for a charging facility according to claim 26, wherein
the supplying the DC power comprises:
in the plurality of power converters,
supplying DC power generated by power generation to the DC bus.

28. The energy management method for a charging facility according to claim 27, wherein
the generating of the DC power comprises:
generating DC power with a power generation module; and
converting the generated DC power to the DC power by a DC/DC converter for a power generation device, and
the independently controlling comprises:
controlling the operation of the DC/DC converter for a power generation device according to the result of monitoring.

29. The energy management method for a charging facility according to claim 27, wherein
the generating comprises:
solar power generating or wind power generating.

30. The energy management method for a charging facility according to claim 23, wherein
the supplying the DC power comprises:
in the plurality of power converters,
converting AC power received from a system to DC power and supplies the DC power to the DC bus;
supplying DC power discharged from a storage battery charged in advance to the DC bus; and
supplying DC power generated by power generation to the DC bus.

31. The energy management method for a charging facility according to claim 30, wherein
the generating of the DC power comprises:
receiving AC power from the system; and
converting the AC power to the DC power with an AC/DC converter for a system power supply, and
the independently controlling comprises:
controlling the operation of the AC/DC converter for a system power supply according to the monitored DC voltage.

32. The energy management method for a charging facility according to claim 31, the energy management method further comprising:
receiving DC power from the DC bus and converting the received DC power to the DC power to charge a storage battery, wherein
the generating of the DC power comprises:
discharging DC power charged in advance in the storage battery; and converting the discharged DC power to the DC power and supplying the DC power to the DC bus by a DC/DC converter for a storage device, and the independently controlling comprises:
controlling power supply to the DC bus or the storage battery of the DC/DC converter for a storage device according to the result of monitoring.

33. The energy management method for a charging facility according to claim 32, wherein the generating of the DC power comprises:
generating DC power with a power generation module; and
converting the generated DC power to the DC power by a DC/DC converter for a power generation device, and the independently controlling comprises:
controlling the operation of the DC/DC converter for a power generation device according to the result of monitoring.

34. The energy management method for a charging facility according to claim 33, wherein the generating comprises:
solar power generating or wind power generating.

* * * * *